United States Patent [19]

Horie et al.

[11] Patent Number: 4,928,444
[45] Date of Patent: May 29, 1990

[54] SOLAR HOUSE WITH ROOF BOARD OF ADJUSTABLE INCLINATION

[76] Inventors: Mitsukazu Horie; Shigemitsu Horie; Haruo Horie, all of Hiromi 2381-1, Kani-shi, Gifu-ken 509-02, Japan

[21] Appl. No.: 216,093
[22] Filed: Jul. 7, 1988
[30] Foreign Application Priority Data
Jul. 8, 1987 [JP] Japan .............................. 62-171620

[51] Int. Cl.$^5$ .............................................. E04B 7/16
[52] U.S. Cl. ............................................ 52/66; 52/72
[58] Field of Search ................. 52/66, 72, 200; 47/17

[56] References Cited

U.S. PATENT DOCUMENTS

| | | | |
|---|---|---|---|
| 74,120 | 2/1868 | Naylon | 52/66 |
| 87,668 | 3/1869 | Hayes | 52/72 |
| 311,245 | 1/1885 | Henn | 52/66 |
| 1,109,177 | 9/1914 | Putnam | 52/72 |
| 1,137,473 | 4/1915 | Ford | 52/66 |
| 1,410,625 | 3/1922 | Sylvan | 52/72 |
| 1,418,061 | 5/1922 | Blaski | 52/72 |
| 1,552,893 | 9/1925 | Sylvan | 52/72 |
| 2,098,469 | 11/1937 | Smith | 52/66 |
| 3,091,056 | 5/1963 | La Porte | 52/66 |
| 4,015,377 | 4/1977 | Jastrzelski | 52/66 |

Primary Examiner—Michael Safavi
Attorney, Agent, or Firm—Flynn, Thiel, Boutell & Tanis

[57] ABSTRACT

A roof structure of a building having two roof surfaces, one being downwardly inclined from a top ridge in a southernly direction, and the other being downwardly inclined from the ridge in a northernly direction. South and north side openings extend upwardly through the roof surfaces on opposite sides of the ridge. A shaft is rotatably along the top ridge. A roof board selectively closes off one of the south and north side openings. The roof board has a central part supported by the shaft as a fulcrum for swinging movement between a first position wherein a southern portion of the roof board closes the south side opening and a second position wherein a northern portion of the roof board closes the north side opening. A skylight is supported on the roof board adjacent one end edge thereof.

8 Claims, 9 Drawing Sheets

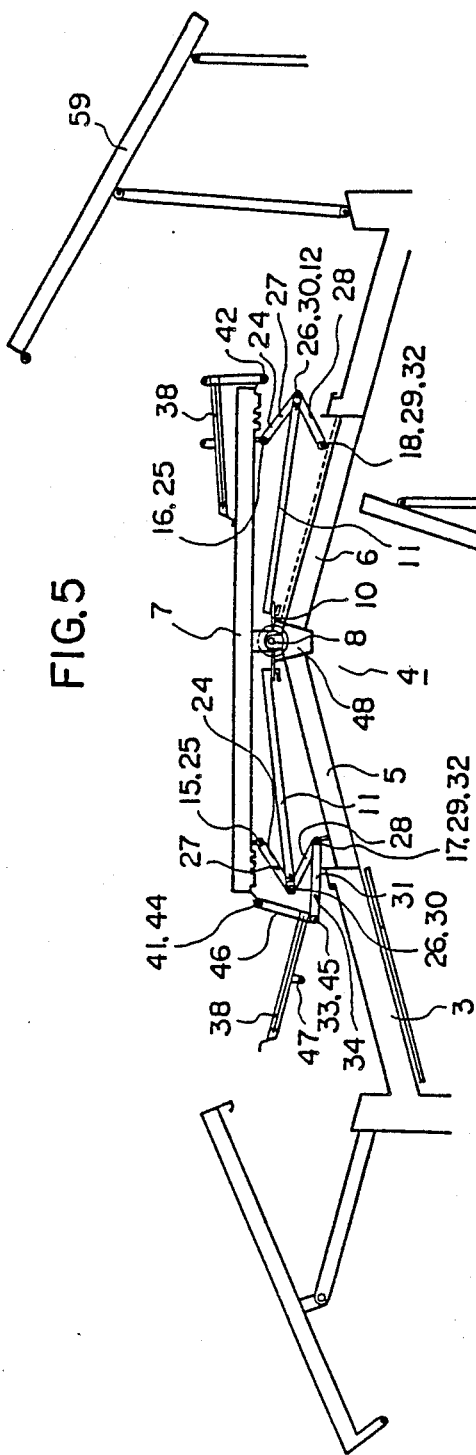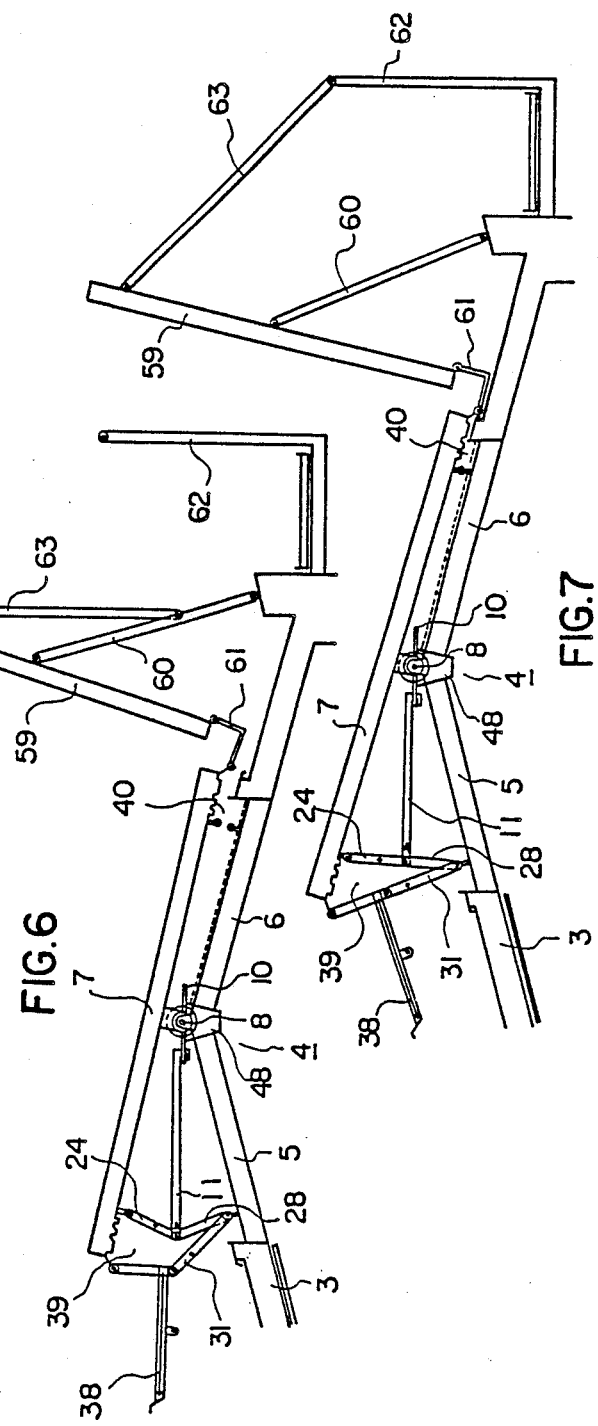

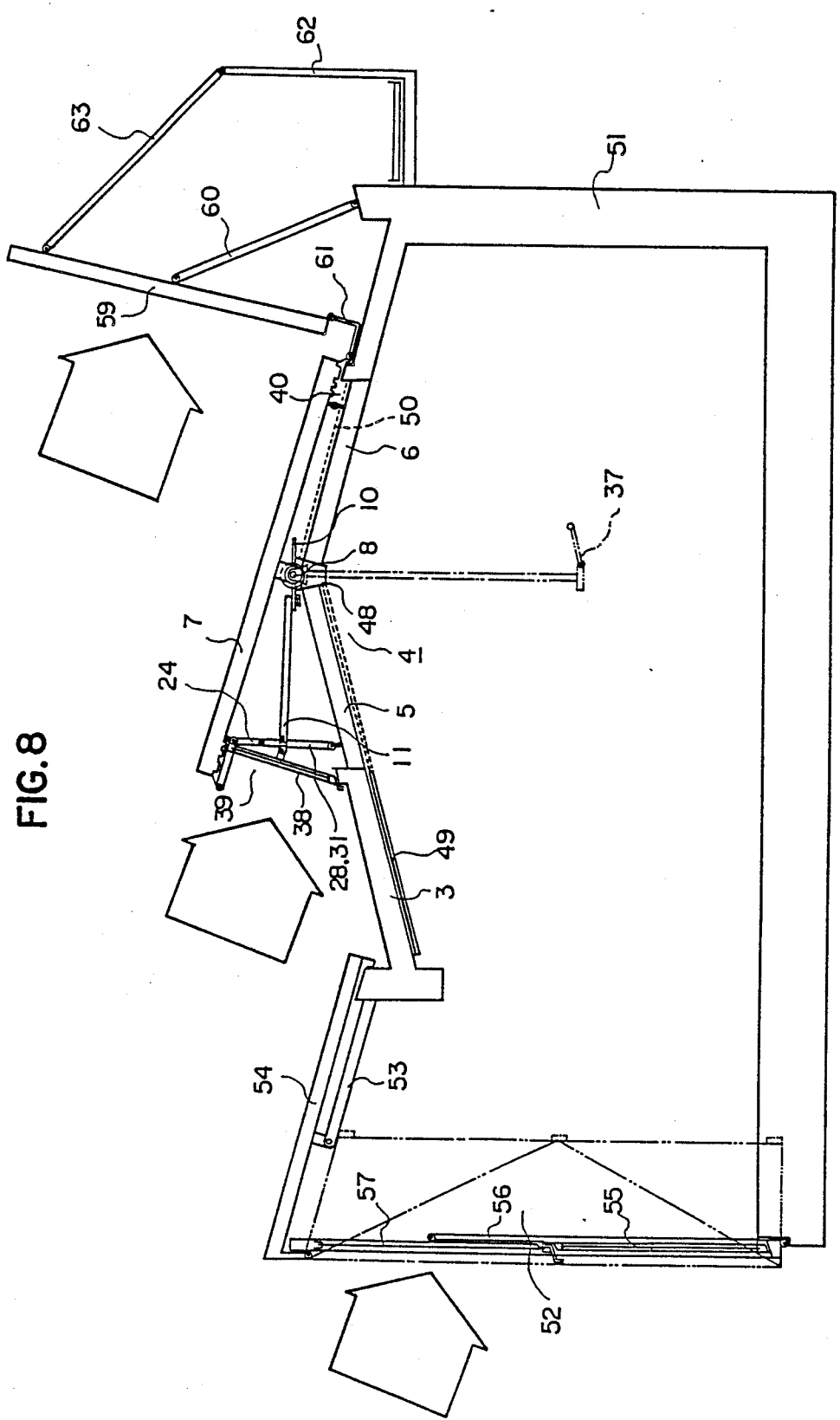

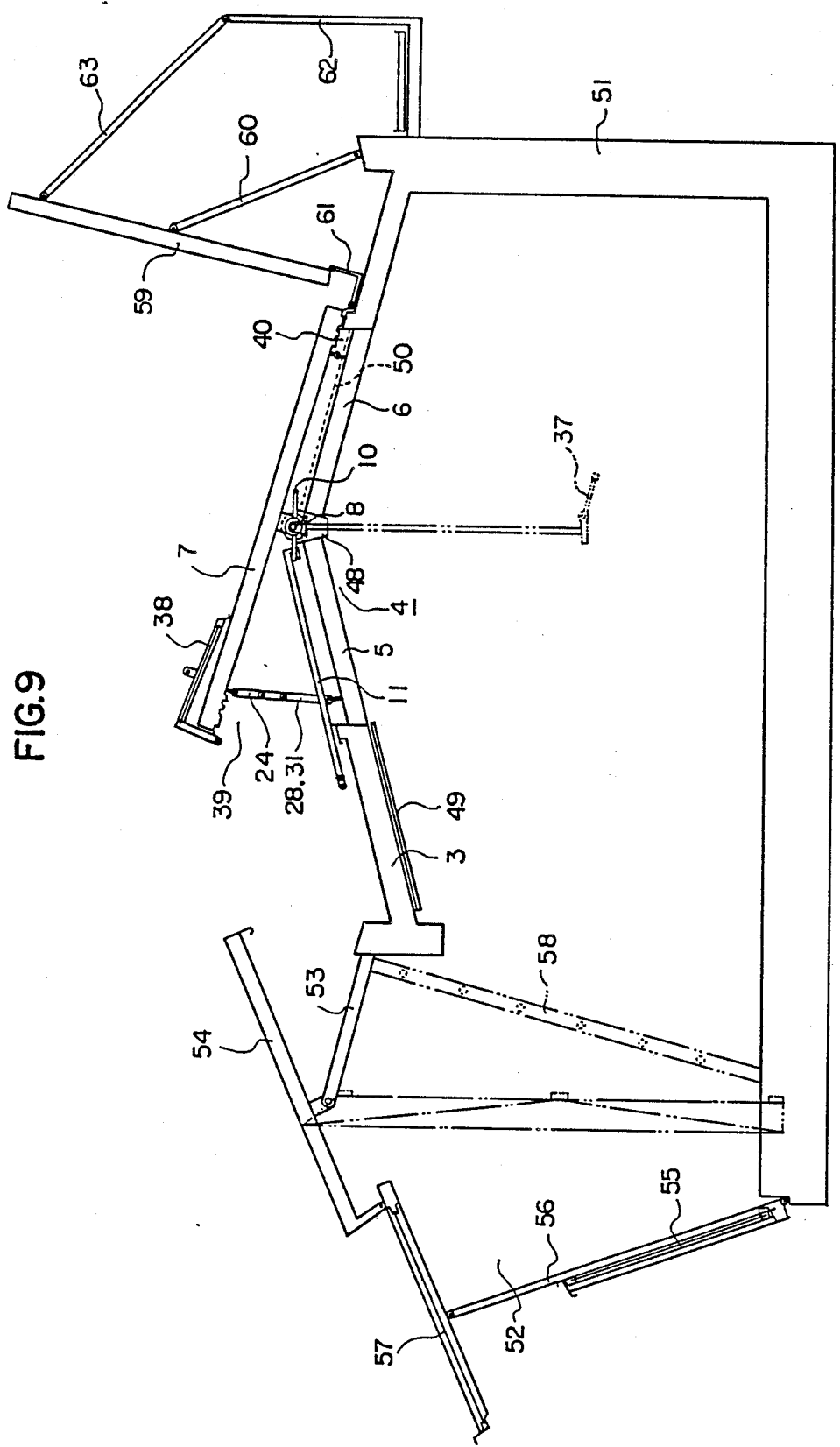

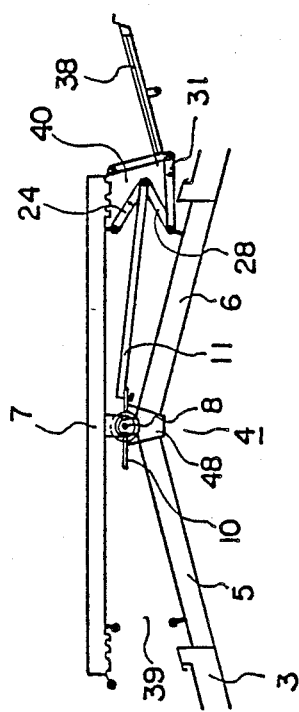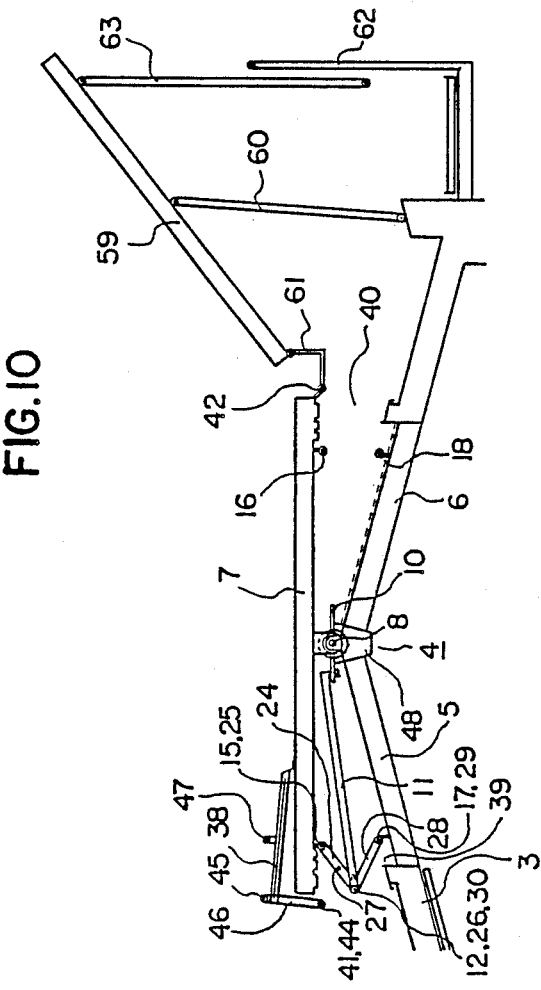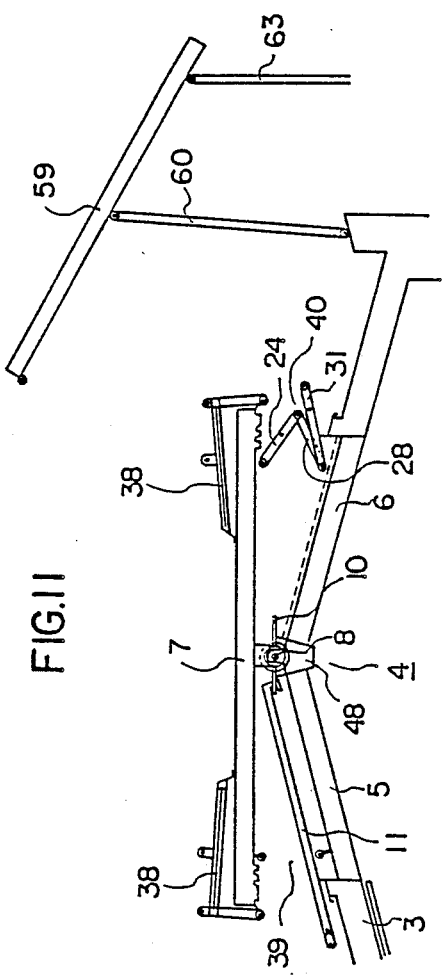

SOLAR HOUSE WITH ROOF BOARD OF ADJUSTABLE INCLINATION

FIELD OF THE INVENTION

This invention relates to a solar house having a roof which enables changing of the angle of inclination according to the season to permit desired sunshine utilization and ventilation.

BACKGROUND OF THE INVENTION

In the conventional solar house, the controlling of solar heat from sunshine is due to the selection of manner factors such as the selection of the color and materials of the roof surface or wall surface, the providing of eaves, sunshades and so forth, the selection of the form, position, and direction of openings such as windows, and the technical skill or formation in the utilization of the surroundings of the building, trees and so forth.

If the best conditions of sunshine and ventilation are required, then the conventional fixed building is expensive to construct and maintain.

The positive maintenance of the ventilation is required in summer, and a large south side opening area is required because the sun's rays from the south are a maximum all day long, and isolation of outer air is required in winter.

The conditions associated with sunshine and ventilation cause inconsistency between summer and winter, and lead to a decrease of the efficiency as a whole.

Thus it is difficult to maximize the comfort of the building under the natural conditions.

An object of the invention is to provide a solar house having a roof which enables changing of the angle of inclination thereof.

A roof of a building is comprised of an angled roof skeleton construction which includes two roof surfaces which downwardly incline to the south and north directions respectively. This angled roof skeleton construction has a rotary axis along its ridge which movably supports a flat roof board about its center of gravity in order to selectively open or close a south side roof opening or a north side roof opening. The rotary axis enables changing of the angle of inclination of the roof board.

According to seasons and weather, a skylight is pivotally linked to an outer edge of the roof board and projects downwardly to the lower edge of the roof opening which is uncovered by the roof board.

The south side of the building is provided with a penthouse roof board which is capable of changing its angle of inclination, and an openable and closable glass wall unit is connected to the penthouse roof board.

During the fall season between summer and winter, the skylight is detached from the north side sloping roof surface, and the roof board is pivotally moved from a position wherein it closes the south side roof opening toward a position wherein it closes the north side roof opening. The plural sets of link structures under the north side of the roof board are removed and then mounted under the south side of the roof board, and the skylight is provided on the south side sloping roof surface so that it can be opened or closed.

During the spring season between winter and summer, the skylight is detached from the south side sloping roof surface, and the roof board is reversely pivotally moved so as to open the north side roof opening direction, and the plural sets of link structures are removed from under the south side of the roof board and are provided under the north side thereof, and the skylight is also mounted on the north side end of the roof board.

BRIEF DESCRIPTION OF THE DRAWINGS

FIGS. 4 to 7 indicate the operational order of the opening and closing from winter to summer.

FIG. 8 is a vertical sectional view of the regulated building in winter.

FIGS. 9 to 12 indicate the operational order of the opening and closing from summer to winter.

DETAIL DESCRIPTION OF THE INVENTION

Figure 1:
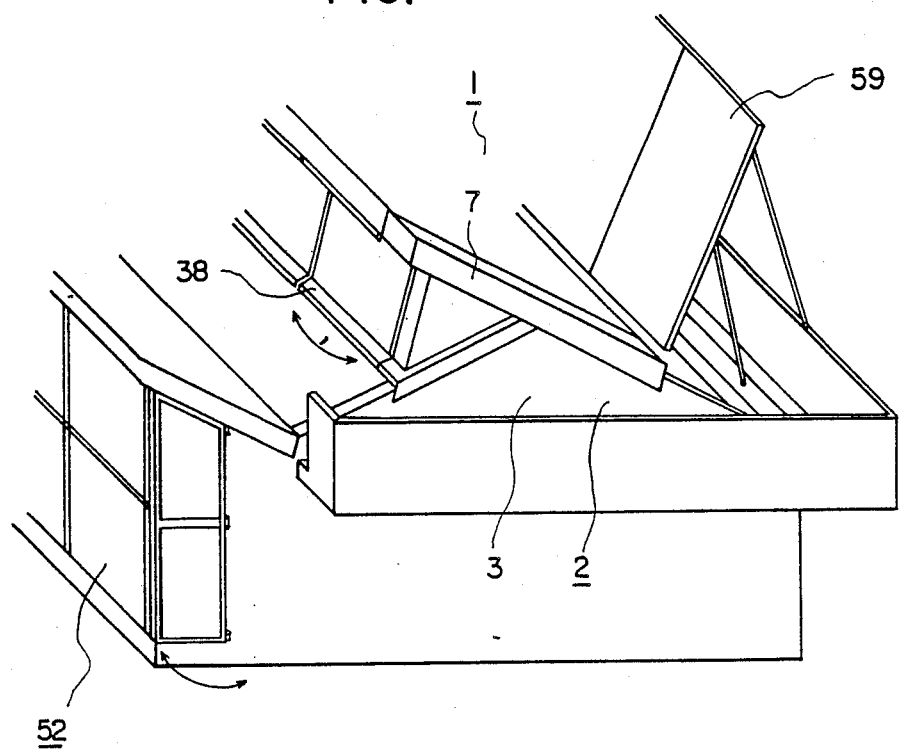
FIG. 1 and FIG. 2 are perspective views of a solar house having a roof of changeable inclination in accordance with the invention.
Figure 2:
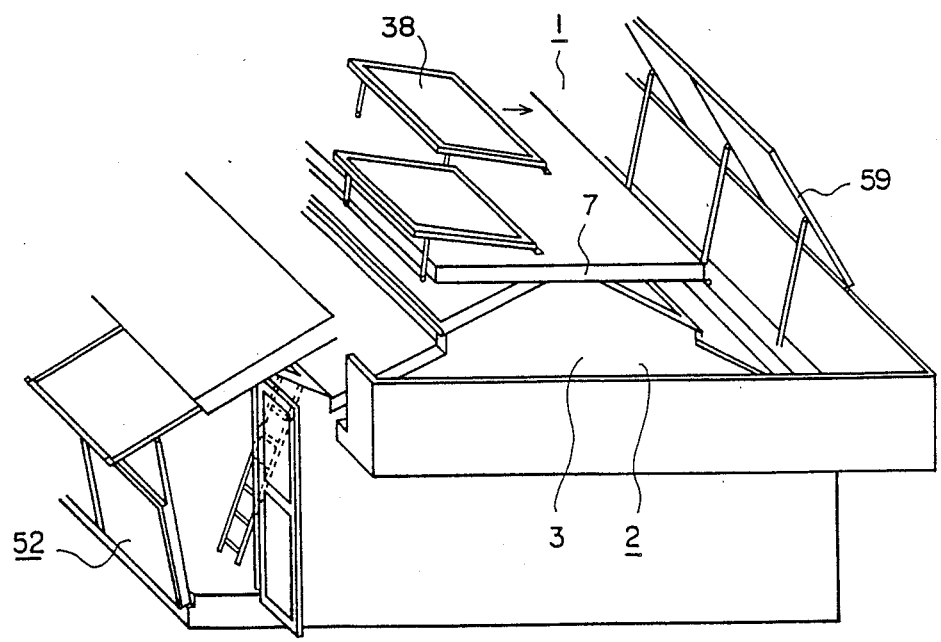

In the embodiment of the invention illustrated in the drawing, a roof 2 of a building 1 is provided with an angled roof skeleton construction 3 which includes inclined roof surfaces which meet at a ridge line and which are individually downwardly inclined in the north and south directions.

An opening 4 extending in both the north and south inclined direction is formed at the central top of the angled roof skeleton construction 3, and forms a south side opening 5 and a north side opening 6.

A roof board 7 has an area which sufficiently covers the entire opening 4, and on its surface has a plate which has a high reflection factor for solar beams, for example stainless steel. The roof board 7 is pivotally supported by a rotary shaft 8 disposed along the ridge of the angled roof skeleton construction 3. The movement of the roof board 7 selectively opens or closes the south side opening 5 or the north side opening 6.

Figure 13:
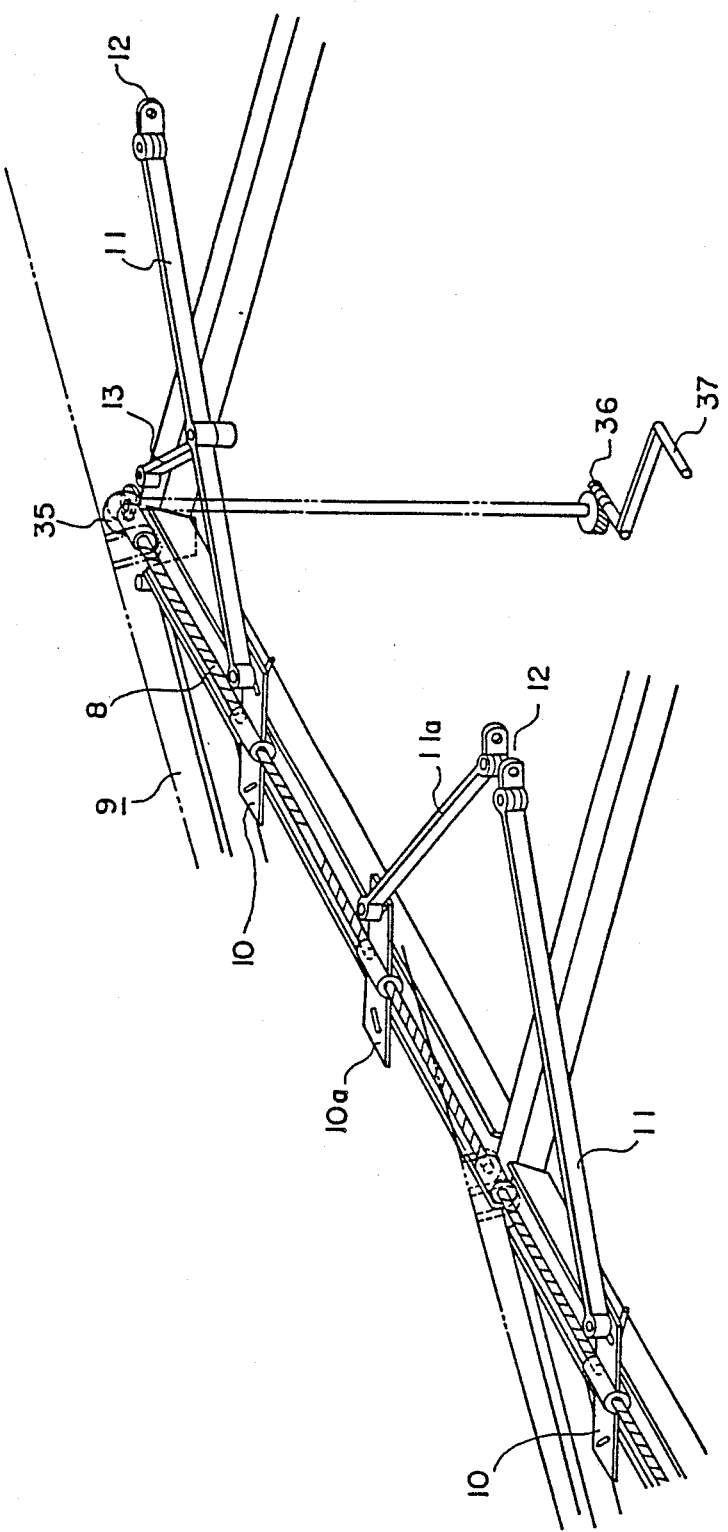
FIG. 13 is a perspective view of an interlocking device.
Figure 14:
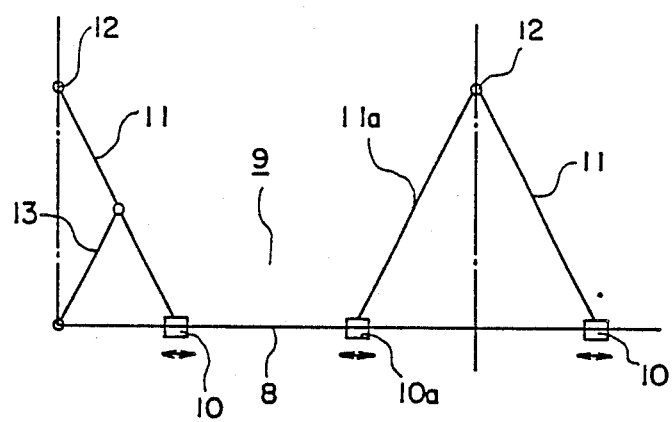
FIG. 14 illustrates the link structure of FIG. 13.

An interlocking device 9 (FIG. 13) serves to change the angle of inclination of the roof board 7 by operation from inside the house.

The rotary shaft 8 has right hand and left hand screw threads provided thereon and screw engaged with sliders 10, 10a. The sliders 10, 10a are removably pivotally linked with the ends of operation links 11, 11a. The sliders 10, 10a always move in opposite directions along the shaft 8, and themselves move in opposite directions for opening or closing the respective roof opening.

The extreme linking points 12, 12a of the operation links 11, 11a slide along a direction making a right angle with the rotary shaft 8 (the ridge direction of the roof) when the shaft 8 rotates, this right angle direction being a north-and-south direction.

The end portion of the rotary shaft 8 is threaded, and screwed to a slider 10 removably linked to the operation link 11. The end of the rotary shaft 8 is linked to a supporting link 13 which at its end is linked to the middle of the operation link 11.

Therefore the extreme linking point 12 of this operation link 11 slides along a north-and-south direction making a right angle with the rotary shaft 8 (the ridge direction of the roof) due to rotation of the shaft 8.

A south side linking (i.e. pivot) point 15 and a north side linking point 16 are disposed at opposite ends of the roof board 7 adjacent the under surface thereof. The south side opening 5 has a linking point 17 adjacent its lower end, and the north side opening 6 has a linking point 18 adjacent its lower end.

An upper link 24 has at its upper end a linking point 25 which is removably fitted to the linking point 15. The upper link 24 has a linking point 26 at its lower end, and a central linking point 27 at its center.

A lower link 28 has at its lower end a basic linking point 29 which is removably fitted to the linking point 17, and the lower link 28 has a linking point 30 at its upper end.

A supporting fixture link 31 projects upwards and has a basic lower linking point 32 which is removably linked at the linking point 17. The supporting link 31 has a linking point 33 at its other end, and a central linking point 34 at its central point.

The operation links 11, 11a, the upper link 24, the lower link 28 and the supporting fixture link 31 are prepared in plural sets, and can be changed so as to be used either on the south side or the north side, whenever the roof board 7 shifts in accordance with the seasons.

The rotary shaft 8 comprises a pinion 35 (FIG. 13) at its end. An operation handle 37 can be rotated in either direction. A worm gear 36 is intervened between the pinion 35 and the operation handle 37. The operation handle 37 is rotatably disposed inside of a house, for example on an inner wall. The worm gear 36 and the rotary shaft 8 respectively have shafts provided with gear wheels at a mutual connecting point, whereby the revolution of the operation handle 37 is interlocked to the rotary shaft 8 through the intermediate shaft.

When one of the south opening 5 or north opening 6 is opened, a skylight 38 is interposed between the eaves of the roof board 7 and the end of a south sloping surface 39 or a north sloping surface 40. The roof board 7 is provided with a south linking point 41 at one end thereof for the skylight 38, and a north linking point 42 at the other end thereof for the skylight 38.

The skylight 38 is fixed to a bracket 46 having a linking point 44 at the end thereof. The skylight 38 is provided a turning-linking point 47 at the center of the skylight frame, and a supporting fixture linking point 45 at the end of the skylight frame for changing the slope or inclination thereof.

The linking point 44 of the skylight 38 is removably linked to either the south linking point 41 or the north linking point 42. The fixture supporting-linking point 45 is removably linked to the end linking point 33 of the supporting fixture link 31 as shown in FIG. 5. And the turning-linking point 47 of the skylight 38 is removably linked to the extreme linking point 12 of the operation links 11, 11a as shown in FIG. 8.

A grooved crossbeam 48 is located along the east-west directed ridge of the angled roof skeleton construction 3 in order to surround the rotary shaft 8 from the lower side thereof.

An insulating panel 49 made of an insulated board opens and closes the south opening 5 and is slidably supported along the south sloping surface 39. The insulating panel 49 closes up tightly against the grooved crossbeam 48 when the insulating panel 49 is closed.

A wire door or screen 50 is disposed over the north side opening 6.

A north wall 51 of the building 1 having no openings is made of a high heat capacity material, for example thick concrete. The south side of the building 1 is provided with a glass window or wall unit 52 for opening and closing. A cantilever arm 53 projects from a south side girder of the angled roof skeleton construction 3. A penthouse roof board 54 is hingedly linked at its center to the end of the cantilever arm 53.

The upper end of a sliding operation link 56, having a pivoted window 55 mounted on its lower part, can be moved to project in an outside direction. The sliding operation link 56 is pivotally linked, at its lower end, to the front of the south side of the building 1. A sliding window 57 is pivotally linked, at its center, to the upper end of the sliding operation link 56. Window 57, adjacent its upper end, is also pivotally linked to the south side end of the penthouse roof board 54.

Therefore, the glass wall unit 52 is possible to be closed as shown in FIG. 8. Furthermore, the upper part of glass wall unit 52 can be opened by projecting the sliding operation link 56 outwardly to open the upper window 57. The lower pivoted window 55 can also be opened.

When the glass wall unit 52 is opened, the penthouse roof board 54 and the top window 57 serve the purpose of not only permitting ventilation but also create a sun-shade.

A ladder 58 (FIG. 4) is diagonally hung from the end of the cantilever arm 53, and forms an entrance to the roof.

A solar energy collector 59 on the roof 2 is pivotally linked, at its center, to the upper end of a pole brace 60. The pole brace 60 is pivotally linked at its lower end to the tip of the north side wall 51 of the building 1.

One end of a coupling lever 61 is pivotally linked to the north linking point 42 of the roof board 7, and the other end of coupling lever 61 is pivotally linked to the south (i.e. inner) end of the solar energy collector 59. The roof board 7 is thus coupled to the solar energy collector 59.

The north (i.e. outer) end of the solar energy collector 59 is pivotally linked to the upper end of the pole brace 63. The lower end of the pole brace 63 is linked to the overhang 62 of the tip of the north sloping surface 40 as shown in FIG. 3.

Figure 3:
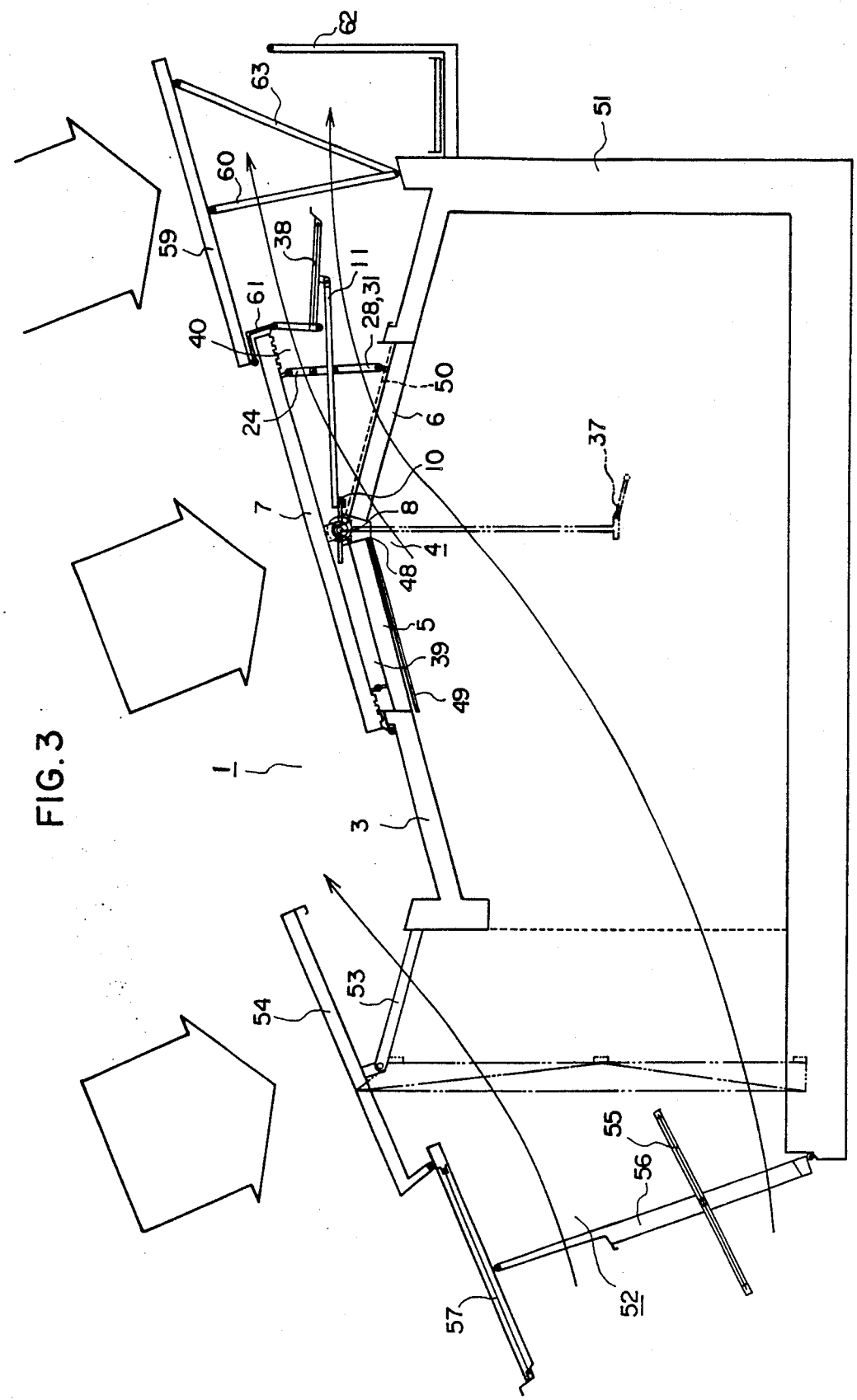
FIG. 3 is a vertical sectional view of the regulated building in summer.

When the roof board 7 opens the north side opening 6, the solar energy collector 59 is disposed on the extended line of inclination of the roof board 7 as shown in FIG. 3.

On the other hand, when the roof board 7 opens the south side opening 5 as shown in FIGS. 6 and 7, the pole braces 60, 63 are provided in order to position the collector 59 at a substantial right angle relative to the roof board 7.

OPERATION

Figure 4:
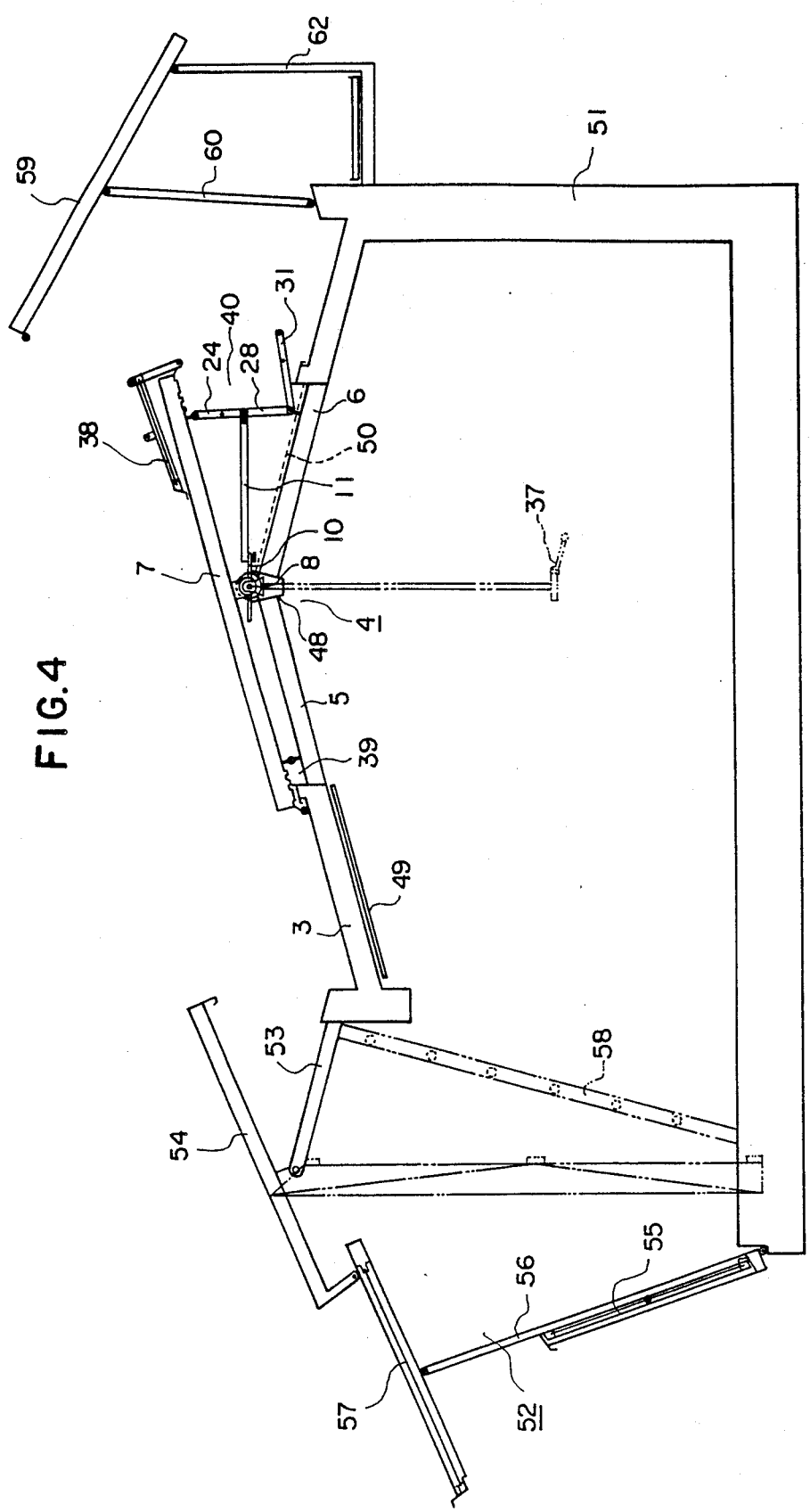

During the middle season (i.e. fall) between summer and winter, the solar energy collector 59 is moved to an upper position (FIG. 4) by removing the coupling lever 61 which links the north linking point 42 of the roof board 7 and the solar energy collector 59. Then the skylight 38 is moved to the upper part of the roof board 7 by releasing the linking of the extreme linking point 12 of the operation links 11, 11a and the turning-linking point 47. When the extreme linking point 33 of the supporting fixture link 31 is released from the central linking point 27 of the upper link 24, the extreme linking point 26 of the upper link 24, the extreme linking point 30 of the lower link 28 and the extreme linking point 12 of the operation link 11 are linked together (as shown in FIG. 4).

Then the rotary shaft 8 is turned by the operation handle 37 through the worm gear 36, the gear wheel, and the intermediate shaft.

Accordingly as the turning motion of the rotary shaft 8, the sliders 10 are closed and contracted, and the extreme linking point 12 of the operation link 11, 11a is projected in the north direction. Because the upper link 24 and lower link 28 are pivotally joined, the roof board 7 is pivoted clockwise toward the north sloping surface 40. The turning of the operation handle 37 is stopped when the roof board 7 is disposed horizontally (FIG. 5), and the plural sets of link structures are then moved to the south sloping surface 39 from the north sloping surface 40 as set forth below.

Every basic linking point of the operation links 11, 11a, the upper link 24, the lower link 28, and the supporting fixture link 31 on the north sloping surface 40 are released.

On the south sloping surface 39, the basic linking points of the operation links 11, 11a are linked to the sliders 10, 10a, the basic linking point 25 of the upper link 24 is linked to the linking point 15 of the south side roof board, and the basic linking point of the lower link 28 is linked to the linking point 17 of the south side opening 5. And the extreme linking point 12 of the operation links 11, 11a, the extreme linking point 26 of the upper link 24, and the extreme linking point 31 of the lower link 28 are linked together.

The basic linking point 32 of the supporting fixture link 31 is linked to the linking point 17 of the south side opening 5, and the linking point 44 of the skylight 38 is linked to the south linking point 41 of the roof board 7. The skylight 38 is supported by the extreme linking point 33 of the supporting fixture link 31 being linked to the supporting fixture linking point 45 (as shown in FIG. 5).

After the coupling lever 61 of the solar energy collector 59 is linked to the north linking point 42 of the roof board 7, the revolution of the operation handle 37 causes the upper link 24 and the lower link 28 to gradually rise (as shown in FIGS. 5, 6 and 7). And the roof board 7 is moved down to close the north sloping opening 6, and the south opening 5 is opened.

The weight of the skylight 38 acts in the direction to assist vertical rising of the link structure, so that the roof board 7 is easily moved.

In this condition, the extreme linking point 33 of the supporting fixture link 31 can be released from the linking point 45 to permit the inclination of the skylight frame to be changed. And the skylight 38 is interposed between the end of the roof board 7 and the south sloping surface 39.

After the extreme linking point 12 of the operation links 11, 11a, the extreme linking point 26 of the upper link 24 and the extreme linking point 30 of the lower link 28 are released, the extreme linking point 33 of the supporting fixture link 31 is linked with the central lining point 27 of the upper link 24, the central linking point 34 of the supporting fixture link 31 is linked with the extreme linking point 26 of the upper link 24 and the extreme linking point 30 of the lower link 28, as shown in FIG. 8, for preventing the roof board 7 from shaking.

When the extreme linking point 12 of the operation links 11, 11a and the turning-linking point 47 for the skylight 38 are linked, the skylight 38 is able to be pushed and pulled without the expansion and contraction of the extreme linking point 12 of the operation links 11, 11a by turning of the operation handle 37 to effect opening and closing of the roof board 7. Then the skylight 38 is opened and closed by the expansion and contraction of the extreme linking point 12 of the operation links 11, 11a (as shown in FIG. 8).

More particularly, the linking point 18 of the north side opening 6 and the linking point 16 of the north side roof board are fixed on the north sloping surface 40, then it will prevent the roof board 7 from shaking.

When the sunbeam angle is small in winter, direct rays of sun shine upon an inner inside part of the north wall 51 through the skylight 38, and direct rays of sun also shine through the glass house wall unit 52.

Thus, the roof arrangement is able to supply illumination and heating, and the north wall 51 which is of high heat capacity effectively stores up the direct heat rays of the sun.

And at night, radiation heat stored up in wall 51 continues the heating, and radiation through the opening 4 is prevented by sliding the insulating panel 49 to close the opening 4.

During the middle season (i.e. spring) between winter and summer, the operation handle 37 is turned in the opposite direction and the plural sets of link structures are detached from the south sloping surface and provided on the north sloping surface, and the roof board 7 is moved in the direction which opens the north opening 6. And the skylight 38 on the north side is able to be opened or closed by providing the skylight 38 on the north side (as shown in FIGS. 11 and 12).

When the sunbeam angle is large in summer, direct rays of the sun are reflected by the surface of the roof board 7, and south wind being frequent in summer improves the natural ventilation of the room by opening the skylight 38 and the glass wall 52 (as shown in FIG. 3).

In case of using the solar energy collector 59, in summer, the solar energy collector 59 is provided at the same angle as the roof board 7, namely at a small inclining angle to the south direction, so that the solar energy collector 59 effectively receives the large angle sunbeams.

In winter, the solar energy collector 59 is positioned so that it can make a right angle with the small angle sunbeams as shown in FIG. 8.

According to seasons, with the arrangement of this invention, it is possible to close and open the skylight 38 by linking the eaves of the roof board 7 to the extreme point of the bracket 46 as a rotary axis which is provided on and projecting from the skylight frame, which skylight can cooperate with the south side opening 5 or the north side opening 6.

The skylight 38 is openable and closable to provide ventilation or lighting. When the skylight 38 is closed, the skylight 38 is linked to the extreme linking point 12 of links 11, 11a and the upper surface is engaged within a notched surface on the roof board, as shown in FIG. 8, whereby activation of links 11, 11a permits the skylight to be opened outwardly.

The south side of the building is provided with a penthouse roof board 54 of changeable inclination, and the openable and closable glass wall unit 52 having a turningsliding window 57 interlocks the penthouse roof board 54. And the extreme point of the penthouse roof board 54 is the basic point of the pivoting of the glass wall unit 52. Then it is possible to obtain the best condition of the room every season by regulating and operating the inclined angle of the roof board 7 in summer or winter. Furthermore, all of the room can be uniformly illuminated on account of lighting from the south side roof opening 5 or the glass wall unit 52 by means of regulating the roof board 7 and the glass wall unit 52.

During summer season, it is possible to ventilate the rooms by utilizing the opened glass wall unit 52 and the north side roof opening 6 as ventilating holes. The roof board 7 is simply moved to the predetermined inclination by the operation of turning the operation handle 37.

And the operation of turning the operation handle 37 enables one to open and close the skylight 38.

It is possible to regulate the ventilation of the room by the opening and closing operation from the operation handle 37 located in a room, under the state in which the roof board 7 is fixed in a predetermined direction and inclination.

The skylight 38 is linked to the eaves of the roof board 7 at the extreme point of the bracket 46 projecting from the window frame as a rotary axis. When the skylight 38 is closed, the skylight 38 is linked to the extreme linking point 12 and the contacting surface with the roof board permits it to function as a sliding out window which turns along a predetermined circumference.

As the radius of the said circumference has sufficient length it is possible to fit flashing board for cooperation with the skylight.

As the actuating link structures are used on the south sloping surface 39 and the north sloping surface 40 symmetrically by changing side, the link structure requires minimum material.

As the skylight 38 is linked to the eaves of the roof board 7, the weight of the skylight 38 can be used to assist in moving the link structure to the inclined direction which makes the roof board 7 easily moved.

We claim:

1. In a roof structure of a building having two roof surfaces which meet at a top ridge, one said roof surface being downwardly inclined away from the ridge in a generally southernly direction, and the other roof surface being downwardly inclined away from the ridge in a generally northernly direction, comprising a south side opening extending upwardly through said one roof surface in the vicinity of said top ridge, a north side opening extending upwardly through said other roof surface in the vicinity of said ridge, said south side and north side openings being disposed in adjacent relationship to one another on opposite sides of said ridge, a rotary shaft rotatably supported on the roof structure and extending generally along the top ridge, a roof board for selectively closing one of the south side and north side openings, the roof board having a central part supported by said rotary shaft as a fulcrum for swinging movement between a first position wherein a southern portion of said roof board closes said south side opening and a second position wherein a northern portion of said roof board closes the north side opening, said southern and northern portions of said roof board being disposed on opposite sides of the fulcrum, said north side opening being uncovered when the roof board is in said first position, said south side opening being uncovered when the roof board is in said second position, said roof board defining outer end edge portions which define opposite free ends of the north and south portions of the roof board and which extend generally parallel with said rotary shaft, one of the end edge portions being spaced upwardly above the respective opening when the other opening is covered by its respective northern or southern portion, and a skylight supported on said roof board adjacent said one end edge portion thereof.

2. A roof structure according to claim 1, wherein said skylight has an upper portion thereof hingedly joined to said roof board adjacent said one end edge portion thereof, said skylight when in a closed position projecting downwardly from said roof board and having a lower edge for engagement with the respective roof structure adjacent a lower end of the respective opening, a radially expandable and contractible linkage connected to and activated in response to rotation of said rotary shaft, said linkage at a radially outer end being detachably hingedly joined to said skylight for controlling opening and closing movement thereof, and a mechanism connected to said rotary shaft for selectively effecting rotation thereof, said mechanism including an operating element disposed within a room located below the roof structure.

3. A roof structure according to claim 1, including a radially expanding and contracting operating linkage connected to and activated in response to rotation of said rotary shaft, and an actuating linkage pivotally connected between said roof board and said operating linkage for effecting pivoting movement of said roof board between said first and second positions, said actuating linkage being pivotally connected between said roof board adjacent one outer end edge portion thereof and the respective roof surface and also being pivotally connected to said operating linkage.

4. A roof structure according to claim 3, wherein said actuating linkage includes an upper link having one end detachably hinged to the roof board and a lower link having one end detachably hinged to the respective roof surface, said upper and lower links having the other ends thereof hinged together and detachably hinged to said operating linkage.

5. A roof structure according to claim 4, wherein said actuating linkage can be detached from said one end edge portion of the roof board and attached to the other end edge portion thereof, and wherein said operating linkage can be detached from the actuating linkage and hingedly attached to the skylight.

6. A roof structure according to claim 1, wherein said skylight can be hingedly attached to or detached from either of said end edge portions of the roof board.

7. A roof structure according to claim 1, including a solar energy collector supported adjacent said other roof surface in close proximity to said north side opening, said solar energy collector being hingedly joined to the northern portion of said roof board adjacent the outer end edge portion thereof, and strut means supported on and projecting upwardly from said roof structure and pivotally supporting said solar collector substantially adjacent the center thereof, said strut means being pivotal relative to the roof structure so that the solar collector can be pivotally swung into a position wherein it is disposed closely adjacent the end edge portion of the roof board and extends substantially perpendicularly upwardly relative thereto when the roof board is in said second position.

8. A roof structure according to claim 1, wherein the building has a south side wall having a leverlike support structure hingedly supported adjacent its lower end so that the leverlike support structure can swing away from an upright position into an outwardly inclined position, said leverlike support structure at its upper end being hingedly joined to the middle of a top window so that the top window can be swingably moved relative to the leverlike support structure between a position wherein it is substantially planar with the support structure and a position wherein it extends substantially transversely relative to the support structure, a penthouse roof board hingedly joined along one edge thereof to a top edge of said top window, and a cantilevered support arm fixed adjacent a lower edge of said one roof surface and projecting outwardly therefrom and having its extreme end hingedly joined to said penthouse roof board adjacent the middle thereof, whereby outward tilting of said leverlike support structure into an open position causes the top window to move into a transverse position relative to the support structure and causes the penthouse roof board to swingably move into a similar inclination, and whereby movement of the leverlike support structure into a closed upright position causes the window to return to an upright closed position and the penthouse roof board to extend between the south wall and an extreme edge of said one roof surface.

* * * * *